United States Patent [19]

Weaver

[11] Patent Number: 4,487,719

[45] Date of Patent: Dec. 11, 1984

[54] AZO DYES FROM SUBSTITUTED 3-AMINO-PYRIDINES WITH ANILINE, TETRAHYDROQUINOLINE AND BENZOMORPHOLINE COUPLERS

[75] Inventor: Max A. Weaver, Kingsport, Tenn.

[73] Assignee: Eastman Kodak Company, Rochester, N.Y.

[21] Appl. No.: 467,562

[22] Filed: Feb. 17, 1983

Related U.S. Application Data

[63] Continuation-in-part of Ser. No. 368,241, Apr. 14, 1982, abandoned, which is a continuation of Ser. No. 183,879, Sep. 4, 1980, abandoned.

[51] Int. Cl.³ .................. C09B 29/036; C09B 29/085; C09B 29/09; C09B 29/36
[52] U.S. Cl. ..................... 534/768; 534/733; 534/770; 534/771; 534/772; 534/773
[58] Field of Search ................ 260/155, 156; 568/28, 568/38

[56] References Cited

U.S. PATENT DOCUMENTS

| | | | |
|---|---|---|---|
| 1,862,361 | 6/1932 | Dohrn et al. | 260/156 |
| 2,010,754 | 8/1935 | Felix et al. | 568/28 X |
| 2,055,727 | 9/1936 | Ott | 568/38 X |
| 2,148,705 | 2/1939 | Mietsch et al. | 260/156 X |
| 2,938,908 | 5/1960 | Tsang et al. | 260/156 X |
| 3,637,803 | 1/1972 | Shen et al. | 568/28 X |
| 3,821,195 | 6/1974 | Putzig | 260/156 |
| 3,978,040 | 8/1976 | Gottschlich et al. | 260/156 X |
| 4,025,301 | 5/1977 | Lang | 260/156 X |

FOREIGN PATENT DOCUMENTS

2034736 6/1980 United Kingdom ............... 260/158

OTHER PUBLICATIONS

Wagner et al, "Synthetic Organic Chemistry", pp. 787, 788, 801 and 802 (1953).
House et al, J. Org. Chem., vol. 34, pp. 3626 to 3627, (1927).

Primary Examiner—Floyd D. Higel
Attorney, Agent, or Firm—Donald W. Spurrell; Daniel B. Reece, III

[57] ABSTRACT

This invention concerns azo dyes having the general formula

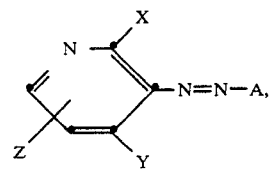

and their preparations in which X, Y and Z are H or any of a variety of substituents, provided that at least one of X and Y must always be a substituent selected from —CN, —NO₂, —CHO, and other selected groups specified herein, and A is the residue of an aniline, tetrahydroquinoline or benzomorpholine type disperse dye coupling component. These dyes which are unexpectedly non-photochromic produce red to blue shades on polyester fibers and exhibit one or more improved properties such as dyeability, dye exhaustion rate, light fastness, non-blooming, pH stability, build, fastness to ozone and nitrogen oxide, crock and wash fastness, migration, transfer, and pH stability on polyester and other fibers including cellulose ester.

9 Claims, No Drawings

AZO DYES FROM SUBSTITUTED 3-AMINO-PYRIDINES WITH ANILINE, TETRAHYDROQUINOLINE AND BENZOMORPHOLINE COUPLERS

This application is a continuation-in-part of Application Ser. No. 368,241 filed Apr. 14, 1982, now abandoned which is a continuation of Application Ser. No. 183,879 filed Sept. 4, 1980, now abandoned.

This invention concerns azo dyes having the general formula

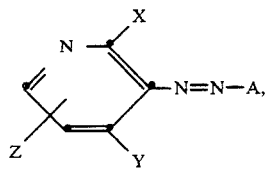

and their preparations, in which X, Y and Z are H or any of a variety of substituents, provided that at least one of X and Y must always be a substituent selected from —CN, —NO$_2$, —CHO, and other selected groups specified herein, and A is the residue of an aniline, tetrahydroquinoline or benzomorpholine type disperse dye coupling component. These dyes which are unexpectedly non-photochromic produce red to blue shades on polyester fibers and exhibit one or more improved properties such as dyeability, dye exhaustion rate, light fastness, non-blooming, pH stability, build, fastness to ozone and nitrogen oxide, crock and washing fastness, migration, transfer, and pH stability on polyester and other fibers including cellulose ester.

The couplers A useful in the present invention have the formulae

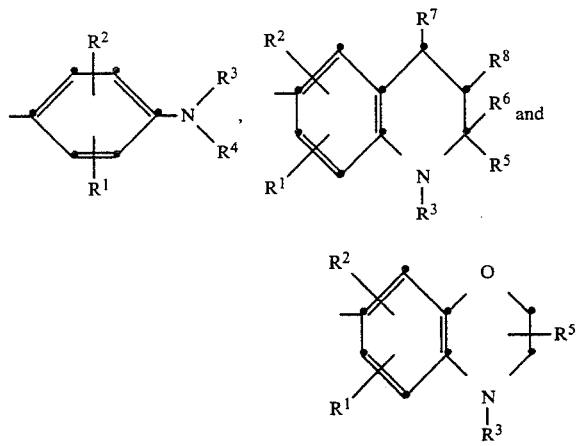

wherein

R$^1$ and R$^2$ are each selected from hydrogen, fluorine, chlorine, bromine, lower alkyl, cycloalkyl, lower alkoxy, phenoxy, lower alkylthio, arylthio, and radicals having the formula —NH—X—R$^9$ in which X is —CO—, —COO—, or —SO$_2$— and R$^9$ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X is —CO—, R$^9$ also can be hydrogen, amino, lower alkenyl, lower alkylamino, lower dialkylamino, arylamino, aryl, or furyl;

R$^3$ and R$^4$ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; straight or branched alkyl of 1-8 carbons and such alkyl substituted with the following: hydroxy; halogen; cyano; amino; lower alkoxy; lower alkoxyalkoxy; lower hydroxyalkoxy; succinimido; glutarimido; phenylcarbamoyloxy; phthalimido; phthalimidino; 2-pyrrolidono; cyclohexyl; phenoxy; phenyl or phenyl substituted with lower alkyl, lower alkoxy, halogen, lower alkanoylamino, cyano or lower alkoxycarbonyl; lower alkanoylamino; lower alkylsulfamoyl; vinylsulfonyl; acrylamido; phthalimido; benzoylsulfonicimido; lower alkylsulfonamido; phenylsulfonamido; lower alkoxycarbonylamino; lower alkylcarbamoyloxy; lower alkoxycarbonyl; lower alkoxycarbonyloxy; lower alkenylcarbonylamino; groups of the formula

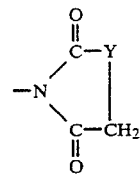

wherein Y is —NH—,

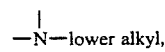

—O—, —S—, or —CH$_2$O—; —S—R$^{10}$ wherein R$^{10}$ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, or

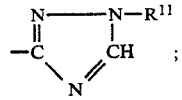

—OXR$^9$; —NH—X—R$^9$; —X—R$^9$; —CONR$^{11}$R$^{11}$; —SO$_2$NR$^{11}$R$^{11}$; wherein R$^9$ and X are as defined above and each R$^{11}$ is selected from H, phenyl, lower alkyl, and lower alkyl substituted with halogen, —OH, phenoxy, aryl, —CN, cycloalkyl, lower alkylsulfonyl, lower alkylthio, lower alkanoyloxy, or lower alkoxy; lower alkoxy; lower alkoxy substituted with hydroxy, cyano, lower alkanoyloxy, or lower alkoxy; phenoxy; phenoxy substituted with one or more of lower alkyl, lower alkoxy or halogen; or R$^3$ and R$^4$ can be a single combined group such as pentamethylene, ethyleneoxyethylene or ethylenesulfonylethylene which, with the nitrogen atom to which it is attached, forms a ring;

R$^5$, R$^6$, R$^7$, and R$^8$ are each selected from hydrogen and lower alkyl; and X, Y, and Z are independently selected from hydrogen, halogen, lower alkyl, lower alkoxy, aryl, cyano, carbamoyl, CONHR$_{12}$,

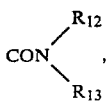

SO$_2$R$_{12}$, COOR$_{12}$, SO$_2$NHR$_{12}$,

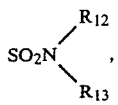

formyl, nitro, SCN, and SR$_{14}$, wherein R$_{12}$ is a group selected from lower alkyl, cycloalkyl, and aryl, each of which R$_{12}$ groups may be substituted with —CN, lower alkoxy, lower alkyl (the chain extended in the case of alkyl), hydroxy, lower alkanoyl or lower alkanoyloxy, R$_{13}$ is lower alkyl which may be substituted with cycloalkyl, or aryl, each of which substituents may itself be substituted with —CN, lower alkoxy, lower alkyl, hydroxy, lower alkanoyl or lower alkanoyloxy, and R$_{14}$ is a group selected from R$_{12}$ and the radicals

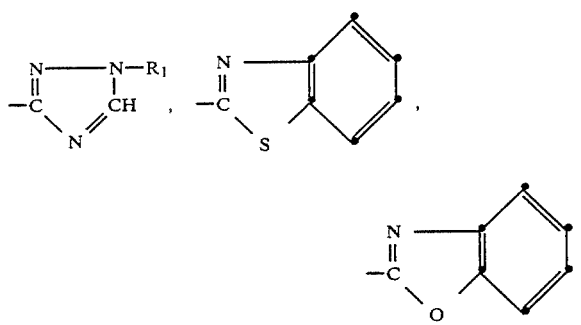

pyridyl, pyrimidinyl, and 1,3,4-thiadiazol-2-yl, and with the proviso that at least one of X and Y must always be cyano, SO$_2$R$_{12}$, SR$_{14}$, carbalkoxy, formyl, or nitro.

Preferred to the above dyes are where X is cyano, SO$_2$R$_{12}$, SR$_{14}$, or NO$_2$; Y is H, halogen, cyano, SO$_2$R$_{12}$, or SR$_{14}$; Z is hydrogen; R$^1$ is NHXR$^9$; R$^2$ is H, lower alkyl or lower alkoxy; and R$^3$ and R$^4$ are each H, lower alkyl, phenyl, cyclohexyl, said cyclohexyl and phenyl substituted with one or two of lower alkyl, —CN, —OH, lower alkoxy, halogen, lower alkanoyloxy or lower alkoxycarbonyl, or lower alkyl substituted with 1–3 of —OH, —CN, lower alkoxy, lower alkoxycarbonyl, succinimido, cyclohexyl, phenyl, lower alkoxyalkoxy, phenoxy, —OXR$^9$, —NH—X—R$^9$, —X—R$^9$, —CONR$^{11}$R$^{11}$, or —SO$_2$NR$^{11}$R$^{11}$.

Most preferred of the above dyes are where X is cyano, SO$_2$R$_{12}$, SR$_{14}$, or NO$_2$; Y is H, halogen, cyano, SO$_2$R$_{12}$, or SR$_{14}$; Z is hydrogen; R$^1$ is meta-lower alkyl, lower alkanoylamino, lower alkylsulfonylamino, or benzoylamino; R$^2$ is H, lower alkyl or lower alkoxy; and R$^3$ and R$^4$ are each lower alkyl, cyclohexyl, or lower alkyl substituted with —OH, —CN, lower alkoxy, lower alkanoyloxy, lower alkoxycarbonyl, succinimido, cyclohexyl, or phenyl.

The term "lower" as used herein means 1–8 carbon atoms.

The couplers are prepared by procedures well known in the art and such couplers are disclosed in general in the patent literature, e.g., U.S. Pat. Nos. 2,805,218; 2,827,450; and 2,839,523.

The novel processes disclosed and claimed herein are as follows:

A. The process comprising reacting a 2- and/or 4-halo-3-pyridylazo dye (of Claim 1 herein) with a metal cyanide in solvent at a temperature of from about 25° C. to about 150° C.

B. The process comprising reacting a 2- and/or 4-halo-3-pyridylazo dye (of Claim 1 herein) with a sulfinic acid salt in solvent at a temperature of from about 25° C. to about 150° C.

C. The process comprising reacting a 2- and/or 4-halo-3-pyridylazo dye (of Claim 1 herein) with a mercaptan in solvent at a temperature of from about 25° C. to about 150° C.

For each of the above reactions the temperature may vary within a wide range depending on the nature of the organic medium and, in particular, on the heat stability of the starting dyestuff. In general, the temperature should be maintained between about 25° and 150° C., with between 25° and 100° C. being preferred. Suitable solvents which may be readily selected by one skilled in the art include, for example, dimethyl sulphoxide, formamide, dimethyl formamide, dimethyl acetamide, N-methyl-pyrrolidone, pyridine, quinoline, acetonitrile, benzonitrile and phosphoric acid-tris-dimethylamide. Catalysts such as cuprous bromide and the like, also well known to the art, may be employed. The dye reactant may be the —Cl, —Br, —I or —F intermediate, and the displaced halogen in each of these reactions may be taken up by a cation, e.g., Na$^+$, K$^+$, or the like which may be present in a reactant, e.g., NaCu(CN)$_2$, or added thereto, such as K$_2$CO$_3$ or sodium acetate, in sufficient amount to maintain the desired neutral or basic reaction system. Typical sulfinic compounds are CH$_3$—SO.ONa and Ph—SO.OK, and typical mercaptans are C$_2$H$_5$—SH and Ph—SH. These reactants, of course, have the general formulae R$_{12}$—SO.OM where, e.g., M is Na$^+$, K$^+$, or the like, and HSR$_{14}$ respectively where R$_{12}$ and R$_{14}$ are defined above.

This invention will be further illustrated by the following examples although it will be understood that these examples are included merely for purposes of illustration and are not intended to limit the scope of the invention.

EXAMPLE 1

Diazotization of 3-Amino-2-Chloropyridine

3-Amino-2-chloropyridine (12.8 g., 0.1 mole) was dissolved in 140 ml. H$_2$O plus 70 ml. of conc. HCl. The solution was cooled and a solution of 7.1 g. of NaNO$_2$ in 70 ml. of water was added at 0°–5° C. After stirring for about 15 min. the diazonium salt was coupled to the couplers below.

N,N-Diethyl-m-acetamidoaniline
N-Ethyl-N-cyclohexyl-m-acetamidoaniline
N-Ethyl-N-2-cyanoethyl-m-acetamidoaniline
N,N-Diethyl-m-methanesulfonamidoaniline
N-Cyclohexyl-2-methoxy-5-acetamidoaniline
N-Ethyl-7-acetamido-2,2,4-trimethyl-1,2,3,4-tetrahydroquinoline N-Ethyl-6-acetamido-3-methyl-2,3-dihydro-1,4-benzoxazine
N,N-Dipropyl-m-benzamidoaniline
N-Ethyl-N-2-succinimidoethyl-m-acetamidoaniline
N,N-Di-2-acetoxyethyl-m-acetamidoaniline For the coupling, the above couplers (0.01 mole of each) were dissolved in 25 ml. of 1:5 acid (1 part propionic:5 parts acetic acid). To the chilled solution of each coupler was added a 0.01 mole aliquot of the above diazonium solution. The mineral acid was neutralized by the addition of solid ammonium acetate. The dyes were precipitated after 1 hour by adding water. The dyes were then isolated by filtering, if solid, and by decantation, if sticky, and reslurried in ethanol for purification before reacting with cyanides, sulfinic acid salts, and mercaptans as exemplified by the following examples.

EXAMPLE 2

Reaction of Halopyridine Azo Dye With Cyanide 0.50 Grams of 3-acetamido-4-(2-chloro-3-pyridylazo)-N,N-diethylaniline, NaCu(CN)$_2$ (0.42 g.) and 10 ml. of N,N-dimethylformamide were mixed and heated at 130°–135° C. for 0.5 hours. Thin-layer chromatography showed that the bathochromic cyano dye had been formed. The reaction solution was dissolved into 20 ml. of water saturated with NaCl and the dye was collected by filtration, washed with water, and dried in air. The cyano dye has a visible absorption maximum at 497 nm in acetone, while the starting chloro dye had a maximum at 480 nm, showing that the cyano dye is considerably more bathochromic than the chloro dye. The cyano dye has the following structure and produces bright scarlet shades:

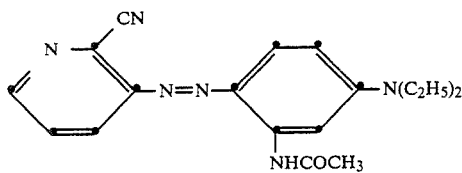

This nucleophilic displacement is unexpectedly easy since the corresponding dye from o-chloroanilinediazo shows little reaction under the same conditions. Other suitable metal cyanides include, for example, silver cyanide, lead cyanide, potassium hexacyanoferrate (II), calcium hexacyanoferrate (II) and copper hexacyanoferrate (II). Other —CN containing metal complexes and compounds known to the art are also useful.

EXAMPLE 3

Reaction of Halopyridine Azo Dye With Mercaptan

3-Acetamido-4-(2-chloro-3-pyridylazo)-N,N-diethylaniline (0.50 g.), 3-mercapto-1(H)-1,2,4-triazole (0.4 g.), potassium carbonate (0.4 g.), cuprous bromide (0.005 g.), and N,N-dimethylformamide (10 ml.) were stirred and heated at reflux for 4 hours. The reaction mixture was drowned into water and acidified with acetic acid to precipitate the dye, which was filtered, washed with water, and dried in air. The dye produced scarlet shades on polyamides and had good light-fastness.

EXAMPLE 4

Reaction of Dihalopyridine Azo Dye with Sulfinic Acid Salt

3-Acetamido-4-(2,4-dibromo-3-pyridylazo)-N,N-diethyl aniline (0.5 g), methanesulfinic acid Na salt (0.5 g.) and N,N-dimethylformamide (5 ml.) were mixed and heated with stirring at 95°–100° C. for 2 hours. The reaction mixture was drowned into water. The dye was isolated by filtration, washed with water and dried in air. After recrystallization, the dye melted at approximately 200° C. Elemental analysis showed that both halogen atoms had been displaced to yield the following dye:

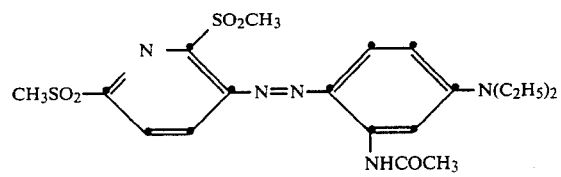

The dye produced bright, light-fast and sublimation-fast red shades on polyester fabric.

EXAMPLE 5

Reaction of Dihalopyridine Azo Dye with Cyanide

The dibromo dye of Example 4 (0.5 g.), sodium dicyanocuprate (0.7 g.), and N,N-dimethylformamide (10 ml.) were heated and stirred together at reflux for 3 hours. The reaction mixture was cooled and water (25 ml.) added. After being heated to approximately 80° C., the mixture was filtered and the dye collected by filtration, washed with water, and dried in air. Mass spectrum analysis showed that the product consisted mostly of the dicyano dye below resulting from displacement of both halogens:

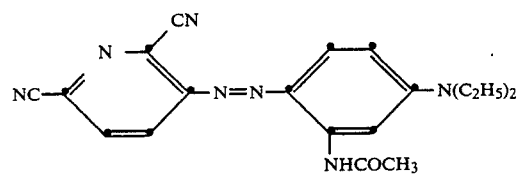

EXAMPLE 6

Displacement of One Halogen with Cyanide in Dihalopyridine Azo Dyes

The dibromo dye of Example 4 (1.0 g.), sodium dicyanocuprate (0.8 g.) and N,N-dimethylformamide (10 ml.) were mixed and heated at reflux for 15 minutes and drowned into water while hot to quench the reaction. The dye was collected by filtration, washed with water and dried in air. Thin-layer chromatography showed only a small amount of the dye of Example 5 present. Mass spectrum analysis confirmed that the major product was the monocyano dye of the formula

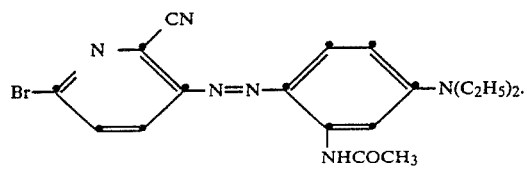

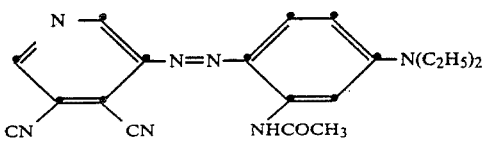

British Patent Specification No. 1,497,095 discloses some 3-pyridylazo dyes suitable for hair dyeing, but those dyes show no suitability for dyeing textile fibers, particularly because of photochromism and poor fastness properties, especially to sublimation.

Particularly useful and most preferred dyes have the formulae:

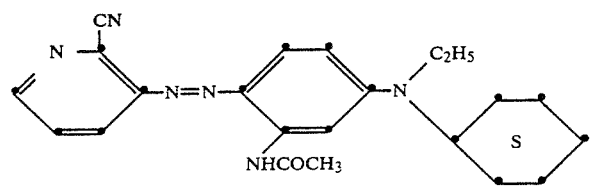

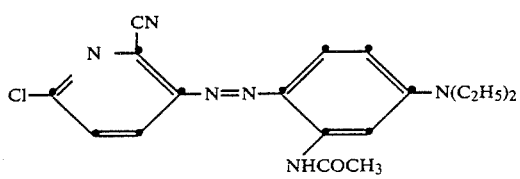

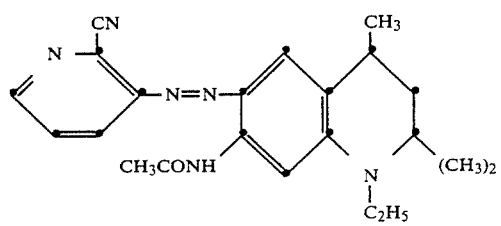

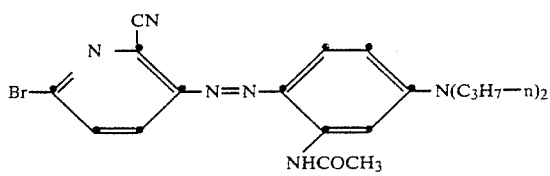

Dyeing of fiber material, according to the invention, is appropriately carried out from an aqueous suspension in the presence of carriers at between 80° and 100° C., in the absence of carriers between 100°–130° C., or using the so-called thermofixing process at 180°–230° C. Printing of textile materials can be carried out by steaming the goods, printed with the present dyes in the presence of a carrier at temperatures between 80° and 110° C. or in the absence of a carrier at 110°–140° C., or also by treating the printed goods according to said thermofixing process.

A typical general procedure by which polyester, e.g., poly(ethylene terephthalate) can be dyed with the present dyes is as follows: The dye cake is dispersed by heating and agitating a dyepot containing the dye cake and methyl Cellosolve. When the dyecake has been ground free of lumps and dissolved as much as possible in the methyl Cellosolve, 2% based on weight of the fabric of Igepon T-51 and 2.0% based on weight of the fabric of sodium lignin sulfonate from a premixed solution of the two components is added. Sufficient demineralized water is added to make about a 30:1 bath ratio of water to dye and a small amount of Versene 100 (sodium salt of ethylenediaminetetracetic acid) and Tanalon JDM-72 (dye carrier) are added. The pH of the dyebath is adjusted to about 5.0 with acetic acid. The fabric samples (wet-out) are entered into the dyepot and the entire contents thereof entered into a pressure dyeing container. The container is sealed and entered into a High Temperature Launder-Ometer which is heated to 49° C. and rotation thereof started. The temperature of the Launder-Ometer is raised to 129° C. at the rate of about 2.8° C. per minute, and maintained at this temperature for 1 hour. The Launder-Ometer is then cooled, and the fabric samples removed and scoured in demineralized water containing 1 g./l. of neutral soap and 1 g./l. of sodium carbonate. The samples are rinsed in cold demineralized water and dried at 121° C. in a forced air oven.

The following tables show exemplary dyes of the present invention:

TABLE 1

| X | Y | Z | R¹ | R² | R³ | R⁴ |
|---|---|---|---|---|---|---|
| CN | H | H | H | H | —CH₂CH₃ | —CH₂CH₂OCOCH₃ |
| CN | H | H | H | H | —CH₂CH₃ | —CH₂CH₂CN |
| CN | Cl | H | H | H | —CH₂CH₂OCOCH₃ | —CH₂CH₂OCOCH₃ |
| SCH₃ | H | H | H | H | —CH₂CH₂CN | —CH₂CH₂CN |
| CN | Br | H | H | H | —CH₂CH₂CN | —CH₂CH₂OH |
| CN | NO₂ | H | H | H | —CH₂CH₂CN | —CH₂CH₂OCOCH₃ |
| Cl | NO₂ | 4-Br | H | H | —CH₂CH₃ | —CH₂CH₂CN |
| Br | CHO | 4-Br | H | H | —CH₂CH₃ | —CH₂CH₂OH |
| | | | | | | (succinimide) —CH₂CH₂—N |
| SO₂CH₃ | CN | 5-SO₂CH₃ | H | H | —CH₂CH₂CN | —CH₂CH₂OCOC₆H₅ |
| SO₂CH₃ | H | 4-SO₂CH₃ | H | H | —CH₂CH₂CN | —CH₂CH₂CH₂OH |
| SO₂CH₃ | H | 4-SO₂CH₃ | H | H | —CH₂CH₃ | —CH₂C₆H₅ |
| SO₂C₆H₅ | H | H | H | H | —C₆H₁₁ | —CH₂CHCH₂OH \| OH |
| SC₆H₄OH | I | H | H | H | —C₆H₁₁ | —CH₂CH₂OH |
| SC₆H₅ | H | 4-Cl | H | H | —C₆H₁₁ | —CH₂CH₃ |
| SO₂C₆H₅ | H | 4-SO₂C₆H₅ | H | H | —CH₂CH₃ | —CH₂CH₃ |
| CN | SCH₃ | 4-CN | H | H | —CH₂CH₂OCH₃ | —CH₂CH₂COCH₃ |
| CH₃ | NO₂ | H | —CH₃ | H | —CH₂CH₂OH | —CH₂CH₂OH |
| CN | H | H | —CH₃ | H | —CH₂CH₂OH | —CH₂CH₃ |
| OCH₃ | SO₂CH₃ | H | —CH₃ | H | —CH₂CH₂OCOCH₃ | —CH₂CH₂OCOCH₃ |
| SC₆H₄—m-CH₃ | SC₆H₅ | H | —CH₃ | H | —CH₂CH₃ | —CH₂CHCH₂OH \| OH |
| CN | H | H | —CH₃ | H | —CH₂CH₃ | —CH₂CH₂CN |
| C₆H₅ | SC₆H₁₁ | H | —CH₃ | H | —CH₂CH₃ | —CH₂CH₂Cl |

TABLE 1-continued

[Structure: pyridine ring with N at position 3, X at position 2, Z at position 5, Y at position 6, position 1 connected to N=N-phenyl ring with R¹ (para), R² (meta), and N(R³)(R⁴) substituents]

| X | Y | Z | R¹ | R² | R³ | R⁴ |
|---|---|---|---|---|---|---|
| CN | H | H | —CH₃ | H | —CH₂CH₃ | —CH₂CH₂SO₂CH₂CH₂— |
| CN | H | 4-CN | —NHCOCH₃ | H | —CH₂CH₃ | —CH₂CH₃ |
| CONH₂ | CN | 4-CN | —NHCOCH₃ | —CH₃ | —CH₂CH₂OCOCH₃ | —CH₂CN |
| CONHC₂H₅ | CN | 4-CN | —NHCOCH | —CH₃ | H | —CH₂CH₂OCOCH₃ |
| CON(C₂H₅)₂ | CN | 4-CN | —NHCOCH₃ |  | H | —CH₂CH₂CN |
| CN | H | 4-CN | —NHCOCH₃ | —OCH₃ | H | —CH(CH₃)CH₂CH₃ |
| CN | SO₂CH₃ | 4-CN | H |  | H | [thiophene ring] |
| SO₂CH₃ | H | 4-SO₂CH₃ | —CH₃ | H | —CH₂CH₃ | —CH₂CH₂SO₂NH₂ |
| SO₂N(CH₃)₂ | SO₂C₆H₅ | 4-SO₂CH₃ | —NHCOCH₃ | H | H | —CH₂—[phenyl] |
| SO₂C₄H₉—n | H | 4-SO₂C₄H₉—n | —NHCOCH₃ | H | H | —CH₂CH₂OCH₃ |
| SC₂H₄OH | H | 4-SC₂H₄OH | —NHCOCH₃ | H | H | —CHCH₃<br>   |<br>   CH₂CO₂CH₂CH₃ |
| NO₂ | CO₂CH₃ | 5-CO₂CH₃ | —NHCOCH₃ | H | H | —CH—CH₂CH(CH₃)₂<br>       |<br>      CH₂CH(CH₃)₂ |
| SCH₃ | CO₂C₂H₅ | 5-CN | —NHCOCH₃ | H | H | —CH₂CH(CH₂)₄CH₂OH<br>            |<br>           OH |
| CHO | CO₂C₂H₅ | 5-CN | —NHCOCH₃ | H | H | —CH(CH₃)—CH₂CH₃ |
| COOCH₃ | H | 4-OC₂H₅ | NHCOC₆H₅ | CH₃ | H | [thiophene ring] |

TABLE 1-continued

| X | Y | Z | R¹ | R² | R³ | R⁴ |
|---|---|---|----|----|----|----|
| H | CN | 5-CN | NHSO$_2$C$_6$H$_5$ | H | H | CH$_2$CH$_2$CN |
| SO$_2$C$_6$H$_5$ | H | 4-SO$_2$C$_6$H$_5$ | NHCHO | H | CH$_3$ | CH$_3$ |
| SO$_2$C$_6$H$_5$ | H | 4-CH$_3$ | NHCONHC$_2$H$_5$ | H | CH$_2$CH$_3$ | CH$_2$CH$_3$ |
| SO$_2$C$_6$H$_4$—p-Cl | H | 4-SO$_2$C$_6$H$_4$—p-Cl | NHCO$_2$C$_2$H$_5$ | H | CH$_2$CH$_3$ | CH$_2$C$_6$H$_5$ |
| SO$_2$C$_6$H$_4$—p-CH$_3$ | H | 4-SO$_2$C$_6$H$_4$—p-CH$_3$ | NHCOCH$_3$ | H | CH$_2$CH$_3$ | C$_6$H$_5$ |
| SO$_2$C$_6$H$_4$—m-OCH$_3$ | SO$_2$C$_6$H$_11$ | 4-SO$_2$C$_6$H$_4$—n-OCH$_3$ | NHCOCH$_2$OCH$_3$ | H | CH$_2$CH$_3$ | CH$_2$CH$_2$OH |
| SO$_2$CH$_2$CH$_2$CN | H | 4-SO$_2$CH$_2$CH$_2$CN | NHCOCH$_2$CN | H | CH$_2$CH$_3$ | CH$_2$CH$_2$OCOCH$_3$ |
| SO$_2$CH$_2$C$_6$H$_5$ | H | 4-SO$_2$CH$_2$C$_6$H$_5$ | NHCOCH$_2$OC$_6$H$_5$ | H | CH$_2$CH$_3$ | CH$_2$CH(OH)CH$_2$OH |
| ![O=SC$_2$H$_4$OCCH$_3$] | s-pyridyl | ![O 4-SC$_2$H$_4$OCCH$_3$] | CH$_3$ | OCH$_3$ | CH$_3$ | CH$_2$CH$_2$CN |
| SC$_6$H$_11$ | H | 4-SC$_6$H$_11$ | CH$_3$ | OC$_2$H$_5$ | CH$_2$CH$_2$CN | H |
| SC$_6$H$_11$ | NO$_2$ | H | OCH$_3$ | OCH$_3$ | CH$_2$CH$_2$CN | CH$_2$CH$_2$OH |
| [benzoxazole-like fused ring, N=C—O] | s-pyrimidinyl | H | CH$_3$ | CH$_3$ | CH$_2$CH$_2$CN | CH$_2$CH$_2$OCOCH$_3$ |
| [N=C—NH, thiazole-like] | H | H | NHCOCH$_3$ | Cl | CH$_2$CH$_2$CN | CH$_2$CH$_2$OCOC$_6$H$_5$ |
| [benzothiazole-like fused ring, N=C—S] | CN | H | | | | |

TABLE 1-continued

| X | Y | Z | R¹ | R² | R³ | R⁴ |
|---|---|---|---|---|---|---|
| (thiazole) | CN | 4-S-(pyridyl) | NHCOC$_2$H$_5$ | OCH$_3$ | CH$_2$CH$_2$OH | CH$_2$CH$_2$OH |
| (thiazole) | COOCH$_3$ | H | NHCOC$_6$H$_5$ | H | CH$_2$CH$_2$OCOCH$_3$ | CH$_2$CH$_2$OCOCH$_3$ |
| (N-methyl-thiadiazole) | CN | H | NHCOCH(CH$_3$)$_2$ | H | —CH$_2$CH$_2$SO$_2$CH$_2$CH$_2$— | |
| (acetamido-thiadiazole) | CN | H | NHCOC$_6$H$_5$ | Cl | H | CH$_2$CH$_2$CN |
| NO$_2$ | H | H | NHCONHC$_2$H$_5$ | H | CH$_2$CH$_3$ | CH$_2$CH(OCCH$_3$=O)CH$_2$OCOCH$_3$ |
| CN | H | 4-CN | NHSO$_2$CH$_3$ | H | CH$_2$CH$_3$ | CH$_2$CH$_3$ |
| SO$_2$CH$_2$CH$_3$ | H | 4-SO$_2$CH$_3$ | H | CH$_2$CH$_3$ | CH$_2$CH$_2$OH | CH$_2$CH$_2$NHCOCH$_3$ |
| SO$_2$NHCH$_3$ | H | 4-SO$_2$CH$_3$ | NHCOCH$_3$ | H | CH$_2$CH$_3$ | CH$_2$CH$_2$NHCOC$_6$H$_5$ |
| SO$_2$CH$_3$ | H | 4-SO$_2$C$_6$H$_5$ | NHCOCH(CH$_3$)$_2$ | H | CH$_2$CH$_2$CN | CH$_2$CH$_2$NHCOC$_6$H$_{11}$ |
| SO$_2$C$_6$H$_5$ | H | 4-Cl | NHCOCH$_3$ | H | CH$_2$CH$_3$ | CH$_2$CH$_3$ |
| CN | NO$_2$ | 4-Cl | NHCOCH$_3$ | H | CH$_2$CH$_3$ | CH$_2$CH$_2$OCOCH$_3$ |
| SCN | | | | | | |

TABLE 1-continued

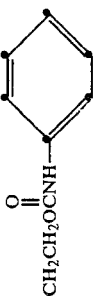

| X | Y | Z | R¹ | R² | R³ | R⁴ |
|---|---|---|----|----|----|----|
| CN | H | 4-Br | NHCOCH₃ | H | CH₂CH₃ | (CH₂CH₂O)₂CH₂CH₃ |
| s-pyridyl | CHO | 4-OCH₃ | NHCOC₆H₅ | H | CH₂CH₃ | CH₂CH₂CONH₂ |
| CN | H | 4-CN | NHCOCH₃ | CH₃ | H | CH₂CH₃ |
| s-pyrimidinyl | CH₃ | 4-CN | NHCOCH₃ | OCH₃ | CH₂CH₃ | CH₂CH₃ |
| CN | Cl | 4-CN | NHCOCH₃ | OCH₃ | CH₂CH₃ | CH₂CH₂OCOCH₃ |
| CN | H | 4-CONH₂ | NHCOCH₃ | OCH₃ | CH₂CH₃ | CH₂CH(OH)CH₃ |
| CN | H | 4-CON(C₂H₅)₂ | NHCOCH₃ | OCH₃ | CH₂CH₂OH | CH₂CH₂OH |
| | | | | | CH₂CH₂OCOCH₃ | CH₂CH₂OCOCH₃ |
| CN | H | 4-SO₂N(C₂H₅)₂ | NHCOCH₃ | OCH₃ | CH₂CH₃ | 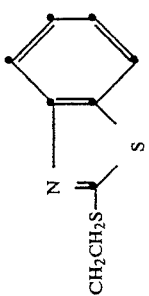 |
| CN | H | 4-SCN | NHCOCH₃ | H | CH₂CH₃ | (4-benzamidophenyl group) |
| CN | H | 4-SCH₃ | NHCOCH₃ | H | CH₂CH₃ | (thiazolyl-methylphenyl group) |
| SC₆H₅ | H | 4-CN | NHCOCH₃ | H | CH₂CH₃ | CH₂CH₂SCH₂CH₃ |
| SC₄H₉—n | H | 4-CN | NHCOCH₃ | H | CH₂CH₃ | CH₂CH₃ |
| CN | C₆H₅ | 4-CN | NHCOCH₃ | H | CH₂CH₃ | CH₂CH₃ |
| CN | CN | 4-CN | NHCOCH₃ | H | CH₂CH₃ | CH₂CH₃ |
| NO₂ | H | H | NHCOCH₃ | H | CH₂CH₃ | CH₂CH₃ |

TABLE II

| X | Y | Z | R¹, R², R⁵, R⁶, R⁷, R⁸ | R³ |
|---|---|---|---|---|
| CN | H | H | 2,7-di-$CH_3$ | —$C_2H_4OH$ |
| CN | H | H | 2,5-di-$CH_3$—8-$OCH_3$ | —$CH_2CH(OH)CH_2OH$ |
| CN | H | H | 2,2,4,7-tetra-$CH_3$ | —$C_2H_4CONH_2$ |
| $SCH_3$ | Cl | H | 2,2,4-tri-$CH_3$ | —$C_2H_4NHCOCH_3$ |
| CN | H | H | 2-$CH_3$—7-$NHCOCH_3$ | —$C_2H_4CN$ |
| CN | Br | H | 2,2,4-tri-$CH_3$—7-$NHCOCH_3$ | —$C_2H_4Cl$ |
| Cl | $NO_2$ | 4-Br | 2-$CH(CH_3)_2$—7-$NHCOCH_3$ | —$C_2H_4OCOCH_3$ |
| Br | CHO | 4-Br | 7-$CH_3$ | —$C_2H_4OC_2H_5$ |
| $SO_2CH_3$ | CN | 5-$SO_2CH_3$ | 3-CN—7-$CH_3$ | —$C_2H_4CONHC_2H_5$ |
| $SO_2CH_3$ | H | 4-$SO_2CH_3$ | 3-$CONH_2$—7-$CH_3$ | —$C_2H_4CONHC_2H_5$ |
| $SO_2CH_3$ | H | 4-$SO_2CH_3$ | 3-Cl—7-$CH_3$ | —$C_2H_4CONHCH_2C_6H_5$ |
| $SO_2C_6H_5$ | H | H | 3-$OCH_3$—7-$CH_3$ | —$C_2H_4OOCOC_2H_5$ |
| $SC_2H_4OH$ | I | H | 2,2,4-di-$CH_3$—5,8-di-$OCH_3$ | —$C_2H_4NHCOCH=CH_2$ |
| $SC_6H_5$ | H | 4-Cl | 2,2,4-tri-$CH_3$—8-$OCH_3$ | —$CH_2C_6H_5$ |
| $SO_2C_6H_5$ | H | 4-$SO_2C_6H_5$ | 2-$CH_3$—7-$NHCOCH_3$ | —$C_2H_4CONHCH_2OH$ |
| CN | $SCH_3$ | 4-CN | 3-OH—7-$CH_3$ | —$C_3H_6NHCONHC_2H_5$ |
| $CH_3$ | $NO_2$ | H | 2,7-di-$CH_3$ | —$C_2H_5$ |
| CN | H | H | 2,5-di-$CH_3$—8-$OCH_3$ | —$C_2H_4SO_2NH_2$ |
| $OCH_3$ | $SO_2CH_3$ | H | 2,2,4,7-tetra-$CH_3$ | —$C_2H_4SO_2NHC_2H_5$ |
| $SC_6H_4$—m-$CH_3$ | $SC_6H_5$ | H | 2,2,4-tri-$CH_3$ | —$C_2H_4SCH_3$ |
| CN | H | H | 2-$CH_3$—7-$NHCOCH_3$ | —$CH_2CH_2S-C(=N-\text{benzothiazolyl})-S$ (2-methylbenzothiazol-2-yl thioether) |
| $C_6H_5$ | $SC_6H_{11}$ | H | 2,2,4-tri-$CH_3$—7-$NHCOCH_3$ | —$CH_2CH_2$—S—(1,2,4-triazol-3-yl) |
| CN | H | H | 2,2,4-tri-$CH_3$—7-$NHCOC_2H_5$ | $C_2H_5$ |
| CN | H | 4-CN | 2-$CH(CH_3)_2$—7-$NHCOCH_3$ | —$CH_2CH_2N(COCH_2)_2$ (succinimido) |
| $CONH_2$ | CN | 4-CN | 7-$CH_3$ | —$C_2H_4O$—$C_6H_5$ |
| $CONHC_2H_5$ | CN | 4-CN | 3-CN—7-$CH_3$ | —$C_2H_4$—N(CO—N($CH_3$)—CO—$CH_2$) |
| $CON(C_2H_5)_2$ | CN | 4-CN | 3-$CONH_2$—7-$CH_3$ | —$CH_2CH(OH)CH_2OH$ |
| CN | H | 4-CN | 3-Cl—7-$CH_3$ | —$C_2H_4$—N(CO—O—CO—$CH_2$) |

TABLE II-continued

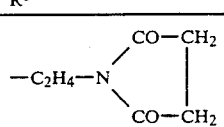

| X | Y | Z | R¹, R², R⁵, R⁶, R⁷, R⁸ | R³ |
|---|---|---|---|---|
| CN | SO$_2$CH$_3$ | 4-CN | 3-OCH$_3$—7-CH$_3$ | −C$_2$H$_4$−N(CO−CH$_2$)(CO−CH$_2$) |
| SO$_2$CH$_3$ | H | 4-SO$_2$CH$_3$ | 2,2,4-di-CH$_3$—5,8-di-OCH$_3$ | −C$_2$H$_4$−N(COCH$_2$)(COCH$_2$) |
| SO$_2$N(CH$_3$)$_2$ | SO$_2$C$_6$H$_5$ | 4-SO$_2$CH$_3$ | 2,2,4-tri-CH$_3$—8-OCH$_3$ | −C$_2$H$_4$−N(CO)(CO)C$_6$H$_4$ |
| SO$_2$C$_4$H$_9$—n | H | 4-SO$_2$C$_4$H$_9$—n | 2-CH$_3$—7-NHCOCH$_3$ | −C$_2$H$_4$−N(CO−NH)(CO−CH$_2$) |
| SC$_2$H$_4$OH | H | 4-SC$_2$H$_4$OH | 3-OH—7-CH$_3$ | −C$_2$H$_4$−N(COCH$_2$)(COCH$_2$)O |
| NO$_2$ | CO$_2$CH$_3$ | 5-CO$_2$CH$_3$ | 2,7-di-CH$_3$ | 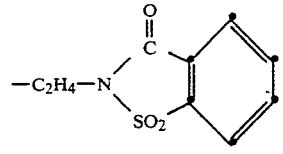 |
| SCH$_3$ | CO$_2$C$_2$H$_5$ | 5-CN | 2,5-di-CH$_3$—8-OCH$_3$ | −C$_2$H$_4$−N(CO−S)(CO−CH$_2$) |
| CHO | CO$_2$C$_2$H$_5$ | 5-CN | 2,2,4,7-tetra-CH$_3$ | 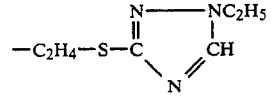 |
| COOCH$_3$ | H | 4-OC$_2$H$_5$ | 2,2,4-tri-CH$_3$ | −C$_2$H$_4$−N(CO−CH$_2$)(CH$_2$−CH$_2$) |
| H | CN | 5-CN | 2-CH$_3$—7-NHCOCH$_3$ | 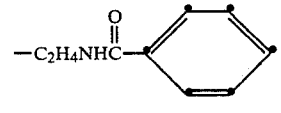 |
| SO$_2$C$_6$H$_5$ | H | 4-SO$_2$C$_6$H$_5$ | 2,2,4-tri-CH$_3$—7-NHCOCH$_3$ | 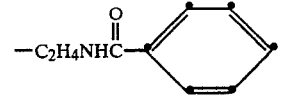 |

TABLE II-continued

| X | Y | Z | R¹, R², R⁵, R⁶, R⁷, R⁸ | R³ |
|---|---|---|---|---|
| $SO_2C_6H_5$ | H | 4-$CH_3$ | 2-$CH(CH_3)_2$—7-$NHCOCH_3$ | $-CH_2CH_2-S-\underset{N}{\overset{N-NH}{\underset{\|\|}{C}}}\hspace{-0.2em}CH$ |
| $SO_2C_6H_4$—p-Cl | H | 4-$SO_2C_6H_4$—p-Cl | 7-$CH_3$ | $-CH_2CH_2-N(CO)(CH_2)C_6H_4$ (N-benzyl benzamide ring) |
| $SO_2C_6H_4$—p-$CH_3$ | H | 4-$SO_2C_6H_4$—p-$CH_3$ | 3-CN—7-$CH_3$ | $-C_2H_4OH$ |
| $SO_2C_6H_4$—m-$OCH_3$ | $SO_2C_6H_{11}$ | 4-$SO_2C_6H_4$—n-$OCH_3$ | 3-$CONH_2$—7-$CH_3$ | $-CH_2CH_2-N(CO)(SO_2)C_6H_4$ (saccharin-type ring) |
| $SO_2CH_2CH_2CN$ | H | 4-$SO_2CH_2CH_2CN$ | 2,2,4,7-tetra-$CH_3$ | $-CH_2CH_2OCNHC_6H_5$ |
| $SO_2CH_2C_6H_5$ | H | 4-$SO_2CH_2C_6H_5$ | 2,2,4,7-tetra-$CH_3$ | $-CH_2CH_2N(COCH_3)_2$-phenyl (phthalimide-type) |
| $SC_2H_4OCCH_3$ (O) | s-pyridyl | 4-$SC_2H_4OCCH_3$ (O) | 2,7-di-$CH_3$ | $-C_2H_4OH$ |
| $SC_6H_{11}$ | H | 4-$SC_6H_{11}$ | 2,5-di-$CH_3$—8-$OCH_3$ | $-CH_2CH(OH)CH_2OH$ |
| benzoxazol-2-ylthio | $NO_2$ | H | 2,2,4,7-tetra-$CH_3$ | $-C_2H_4CONH_2$ |
| 1,2,4-triazol-3-ylthio | s-pyrimidinyl | H | 2,2,4-tri-$CH_3$ | $-C_2H_4NHCOCH_3$ |
| benzothiazol-2-ylthio | CN | H | 2-$CH_3$—7-$NHCOCH_3$ | $-C_2H_4CN$ |

TABLE II-continued

| X | Y | Z | R¹, R², R⁵, R⁶, R⁷, R⁸ | R³ |
|---|---|---|---|---|
| (thiazole) | CN | 4-S-(pyridyl) | 2,2,4-tri-CH$_3$—7-NHCOCH$_3$ | —C$_2$H$_4$Cl |
| (thiazole) | COOCH$_3$ | H | 2-CH(CH$_3$)$_2$—7-NHCOCH$_3$ | —C$_2$H$_4$OCOCH$_3$ |
| (N-methyl thiadiazole) | CN | H | 7-CH$_3$ | —C$_2$H$_4$OC$_2$H$_5$ |
| —S—C(thiadiazole)C—NHCOCH$_3$ | CN | H | 3-CN—7-CH$_3$ | —C$_2$H$_4$CONHC$_2$H$_5$ |
| NO$_2$ | H | H | 3-CONH$_2$—7-CH$_3$ | —C$_2$H$_4$CONHC$_2$H$_5$ |
| CN | H | 4-CN | 3-Cl—7-CH$_3$ | —C$_2$H$_4$CONHCH$_2$C$_6$H$_5$ |
| SO$_2$CH$_2$CH$_3$ | H | 4-SO$_2$CH$_2$CH$_3$ | 3-OCH$_3$—7-CH$_3$ | —C$_2$H$_4$OOCOC$_2$H$_5$ |
| SO$_2$NHCH$_3$ | H | 4-SO$_2$CH$_3$ | 2,2,4-di-CH$_3$—5,8-di-OCH$_3$ | —C$_2$H$_4$NHCOCH=CH$_2$ |
| SO$_2$CH$_3$ | H | 4-SO$_2$CH$_3$ | 2,2,4-tri-CH$_3$—8-OCH$_3$ | —CH$_2$C$_6$H$_5$ |
| SO$_2$C$_6$H$_5$ | H | 4-SO$_2$C$_6$H$_5$ | 2-CH$_3$—7-NHCOCH$_3$ | —C$_2$H$_4$CONHCH$_2$OH |
| CN | H | 4-Cl | 3-OH—7-CH$_3$ | —C$_3$H$_6$NHCONHC$_2$H$_5$ |
| SCN | NO$_2$ | 4-Cl | 2,7-di-CH$_3$ | —C$_2$H$_5$ |
| CN | H | 4-Br | 2,5-di-CH$_3$—8-OCH$_3$ | —C$_2$H$_4$SO$_2$NH$_2$ |
| s-pyridyl | CHO | 4-OCH$_3$ | 2,2,4,7-tetra-CH$_3$ | —C$_2$H$_4$SO$_2$NHC$_2$H$_5$ |
| CN | H | 4-CN | 2,2,4-tri-CH$_3$ | —C$_2$H$_4$SCH$_3$ |
| s-pyrimidinyl | H | 4-CN | 2-CH$_3$—7-NHCOCH$_3$ | —CH$_2$CH$_2$S—C(=N-benzothiazole) |
| CN | CH$_3$ | 4-CN | 2,2,4-tri-CH$_3$—7-NHCOCH$_3$ | —CH$_2$CH$_2$—S—C(triazole-NH) |
| CN | Cl | 4-CN | 2,2,4-tri-CH$_3$—7-NHCOC$_2$H$_5$ | C$_2$H$_5$ |
| CN | H | 4-CONH$_2$ | 2-CH(CH$_3$)$_2$—7-NHCOCH$_3$ | —CH$_2$CH$_2$N(COCH$_2$)$_2$ (succinimido) |
| CN | H | 4-CON(C$_2$H$_5$)$_2$ | 7-CH$_3$ | —C$_2$H$_4$O—C$_6$H$_5$ |

TABLE II-continued

| X | Y | Z | R¹, R², R⁵, R⁶, R⁷, R⁸ | R³ |
|---|---|---|---|---|
| CN | H | 4-SO$_2$N(C$_2$H$_5$)$_2$ | 3-CN—7-CH$_3$ | —C$_2$H$_4$—N(CO—N—CH$_3$)(CO—CH$_2$) |
| CN | H | 4-SCN | 3-CONH$_2$—7-CH$_3$ | —CH$_2$CH(OH)CH$_2$OH |
| CN | H | 4-SCH$_3$ | 3-Cl—7-CH$_3$ | —C$_2$H$_4$—N(CO—O)(CO—CH$_2$) |
| SC$_6$H$_5$ | H | 4-CN | 3-OCH$_3$—7-CH$_3$ | —C$_2$H$_4$—N(CO—CH$_2$)(CO—CH$_2$) |
| SC$_4$H$_9$—n | H | 4-CN | 2,2,4-di-CH$_3$—5,8-di-OCH$_3$ | —C$_2$H$_4$—N(COCH$_2$)(CH$_2$)(COCH$_2$) |
| CN | C$_6$H$_5$ | 4-CN | 2,2,4-tri-CH$_3$—8-OCH$_3$ | —C$_2$H$_4$—N(CO)(CO)C$_6$H$_4$ |
| CN | CN | 4-CN | 2-CH$_3$—7-NHCOCH$_3$ | —C$_2$H$_4$—N(CO—NH)(CO—CH$_2$) |
| NO$_2$ | H | H | 3-OH—7-CH$_3$ | —C$_2$H$_4$—N(COCH$_2$)(O)(COCH$_2$) |

TABLE III

| X | Y | Z | R¹, R², R⁵ | R³ |
|---|---|---|---|---|
| CN | H | H | 3,6-di-CH$_3$ | —C$_2$H$_4$OH |
| CN | H | H | 3-CH$_3$ | —CH$_2$CH(OH)CH$_2$OH |
| CN | H | H | 3-CH$_3$—6-NHCOCH$_3$ | —C$_2$H$_4$CONH$_2$ |
| SCH$_3$ | Cl | H | 6-NHCOCH$_3$ | —C$_2$H$_4$NHCOCH$_3$ |
| CN | H | H | 3,6-di-CH$_3$ | —C$_2$H$_4$CN |
| CN | Br | H | 3-CH$_3$ | —C$_2$H$_4$Cl |
| Cl | NO$_2$ | 4-Br | 3-CH$_3$—6-NHCOCH$_3$ | —C$_2$H$_4$OOCC$_2$H$_5$ |
| Br | CHO | 4-Br | 6-NHCOCH$_3$ | —C$_2$H$_4$OC$_2$H$_5$ |

TABLE III-continued

| X | Y | Z | R¹, R², R⁵ | R³ |
|---|---|---|---|---|
| $SO_2CH_3$ | CN | 5-$SO_2CH_3$ | 3,6-di-$CH_3$ | —$C_2H_4CONHC_2H_5$ |
| $SO_2CH_3$ | H | 4-$SO_2CH_3$ | 3-$CH_3$ | —$C_2H_4CONHC_2H_5$ |
| $SO_2CH_3$ | H | 4-$SO_2CH_3$ | 3-$CH_3$—6-$NHCOCH_3$ | —$C_2H_4CONHCH_2C_6H_5$ |
| $SO_2C_6H_5$ | H | H | 6-$NHCOCH_3$ | —$C_2H_4OCOC_2H_5$ |
| $SC_2H_4OH$ | I | H | 3,6-di-$CH_3$ | —$C_2H_4NHCOCH=CH_2$ |
| $SC_6H_5$ | H | 4-Cl | 3-$CH_3$ | —$CH_2C_6H_5$ |
| $SO_2C_6H_5$ | H | 4-$SO_2C_6H_5$ | 3-$CH_3$—6-$NHCOCH_3$ | —$C_2H_4CONHCH_2OH$ |
| CN | $SCH_3$ | 4-CN | 6-$NHCOCH_3$ | —$C_3H_6NHCONHC_2H_5$ |
| $CH_3$ | $NO_2$ | H | 3,6-di-$CH_3$ | —$C_2H_5$ |
| CN | H | H | 3-$CH_3$ | —$C_2H_4SO_2NH_2$ |
| $OCH_3$ | $SO_2CH_3$ | H | 3-$CH_3$—6-$NHCOCH_3$ | —$C_2H_4SO_2NHC_2H_5$ |
| $SC_6H_4$—m-$CH_3$ | $SC_6H_5$ | H | 6-$NHCOCH_3$ | —$C_2H_4SCH_3$ |
| CN | H | H | 3,6-di-$CH_3$ | —$CH_2CH_2S-C(=N-C_6H_4)-S$ (benzothiazoline) |
| $C_6H_5$ | $SC_6H_{11}$ | H | 3-$CH_3$ | —$CH_2CH_2$-S-(1,2,4-triazole) |
| CN | H | H | 3-$CH_3$—6-$NHCOCH_3$ | —$CH_2CH_2N(COCH_2)_2$ (succinimide) |
| CN | H | 4-CN | 6-$NHCOCH_3$ | —$C_2H_4O$-$C_6H_5$ |
| $CONH_2$ | CN | 4-CN | 3,6-di-$CH_3$ | —$C_2H_4$-N(CO-N(CH_3)-CO-CH_2) (hydantoin) |
| $CONHC_2H_5$ | CN | 4-CN | 3-$CH_3$ | —$CH_2CH(OH)CH_2OH$ |
| $CON(C_2H_5)_2$ | CN | 4-CN | 3-$CH_3$—6-$NHCOCH_3$ | —$C_2H_4$-N(CO-O-CO-CH_2) (oxazolidinedione) |
| CN | H | 4-CN | 6-$NHCOCH_3$ | —$C_2H_4$-N(CO-CH_2-CO-CH_2) |
| CN | $SO_2CH_3$ | 4-CN | 3,6-di-$CH_3$ | —$C_2H_4$-N(COCH_2-CH_2-COCH_2) |

TABLE III-continued

| X | Y | Z | R¹, R², R⁵ | R³ |
|---|---|---|---|---|
| $SO_2CH_3$ | H | 4-$SO_2CH_3$ | 3-$CH_3$ | $-C_2H_4-N(CO)_2C_6H_4$ (phthalimido) |
| $SO_2N(CH_3)_2$ | $SO_2C_6H_5$ | 4-$SO_2CH_3$ | 3-$CH_3$—6-$NHCOCH_3$ | $-C_2H_4-N$(CO-NH)(CO-$CH_2$) (hydantoinyl) |
| $SO_2C_4H_9-n$ | H | 4-$SO_2C_4H_9-n$ | 6-$NHCOCH_3$ | $-C_2H_4-N$(CO$CH_2$-O-CO$CH_2$) (morpholine-2,6-dione) |
| $SC_2H_4OH$ | H | 4-$SC_2H_4OH$ | 3,6-di-$CH_3$ | $-C_2H_4-N$(CO-$SO_2$-$C_6H_4$) (saccharinyl) |
| $NO_2$ | $CO_2CH_3$ | 5-$CO_2CH_3$ | 3-$CH_3$ | $-C_2H_4-N$(CO-S-CO-$CH_2$) |
| $SCH_3$ | $CO_2C_2H_5$ | 5-CN | 3-$CH_3$—6-$NHCOCH_3$ | $-C_2H_4-S-C$(=N-$NC_2H_5$-CH=N) (triazole) |
| CHO | $CO_2C_2H_5$ | 5-CN | 6-$NHCOCH_3$ | $-C_2H_4-N$(CO-$CH_2$-$CH_2$-$CH_2$) (pyrrolidinone) |
| $COOCH_3$ | H | 4-$OC_2H_5$ | 3,6-di-$CH_3$ | $-C_2H_4NHCO-C_6H_5$ |
| H | CN | 5-CN | 3-$CH_3$ | $-C_2H_4NHCO-C_6H_4-OCH_3$ |
| $SO_2C_6H_5$ | H | 4-$SO_2C_6H_5$ | 3-$CH_3$—6-$NHCOCH_3$ | $-CH_2CH_2-S-C$(=N-NH-CH=N) (triazole) |
| $SO_2C_6H_5$ | H | 4-$CH_3$ | 6-$NHCOCH_3$ | $-CH_2CH_2-N$(CO-$C_6H_4$-$CH_2$) (isoindolinone) |

TABLE III-continued

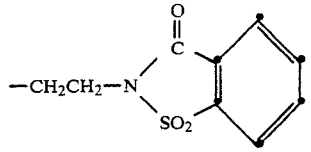

| X | Y | Z | R¹, R², R⁵ | R³ |
|---|---|---|---|---|
| $SO_2C_6H_4$—p-Cl | H | 4-$SO_2C_6H_4$—p-Cl | 3,6-di-$CH_3$ | —$C_2H_4OH$ |
| $SO_2C_6H_4$—p-$CH_3$ | H | 4-$SO_2C_6H_4$—p-$CH_3$ | 3-$CH_3$ | 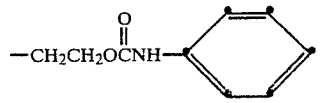 |
| $SO_2C_6H_4$—m-$OCH_3$ | $SO_2C_6H_{11}$ | 4-$SO_2C_6H_4$—n-$OCH_3$ | 3,6-di-$CH_3$ | 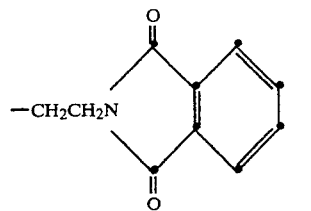 |
| $SO_2CH_2CH_2CN$ | H | 4-$SO_2CH_2CH_2CN$ | 3,6-di-$CH_3$ | 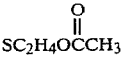 |
| $SO_2CH_2C_6H_5$ | H | 4-$SO_2CH_2C_6H_5$ | 3,6-di-$CH_3$ | —$C_2H_4OH$ |
| $SC_2H_4OCCH_3$ (O) | s-pyridyl | 4-$SC_2H_4OCCH_3$ (O) | 3-$CH_3$ | —$CH_2CH(OH)CH_2OH$ |
| $SC_6H_{11}$ | H | 4-$SC_6H_{11}$ | 3-$CH_3$—6-$NHCOCH_3$ | —$C_2H_4CONH_2$ |
| 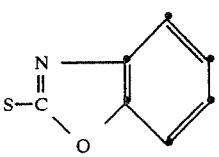 | $NO_2$ | H | 6-$NHCOCH_3$ | —$C_2H_4NHCOCH_3$ |
| 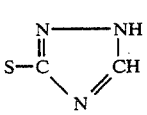 | s-pyrimidinyl | H | 3,6-di-$CH_3$ | —$C_2H_4CN$ |
| 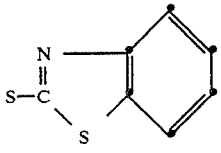 | CN | H | 3-$CH_3$ | —$C_2H_4Cl$ |
| 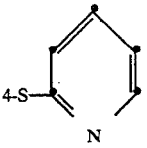 | CN |  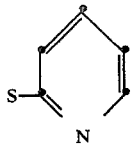 | 3-$CH_3$—6-$NHCOCH_3$ | —$C_2H_4OOCC_2H_5$ |

TABLE III-continued

| X | Y | Z | R¹, R², R⁵ | R³ |
|---|---|---|---|---|
| ![pyrimidine-2-thione ring] | COOCH₃ | H | 6-NHCOCH₃ | —C₂H₄OC₂H₅ |
| ![1-methyl-1,2,4-triazole-3-thio] | CN | H | 3,6-di-CH₃ | —C₂H₄CONHC₂H₅ |
| —S—[5-(NHCOCH₃)-1,3,4-thiadiazol-2-yl] | CN | H | 3-CH₃ | —C₂H₄CONHC₂H₅ |
| NO₂ | H | H | 3-CH₃—6-NHCOCH₃ | —C₂H₄CONHCH₂C₆H₅ |
| CN | H | 4-CN | 6-NHCOCH₃ | —C₂H₄OCOC₂H₅ |
| SO₂CH₂CH₃ | H | 4-SO₂CH₂CH₃ | 3,6-di-CH₃ | —C₂H₄NHCOCH=CH₂ |
| SO₂NHCH₃ | H | 4-SO₂CH₃ | 3-CH₃ | —CH₂C₆H₅ |
| SO₂CH₃ | H | 4-SO₂CH₃ | 3-CH₃—6-NHCOCH₃ | —C₂H₄CONHCH₂OH |
| SO₂C₆H₅ | H | 4-SO₂C₆H₅ | 6-NHCOCH₃ | —C₃H₆NHCONHC₂H₅ |
| CN | H | 4-Cl | 3,6-di-CH₃ | —C₂H₅ |
| SCN | NO₂ | 4-Cl | 3-CH₃ | —C₂H₄SO₂NH₂ |
| CN | H | 4-Br | 3-CH₃—6-NHCOCH₃ | —C₂H₄SO₂NHC₂H₅ |
| s-pyridyl | CHO | 4-OCH₃ | 6-NHCOCH₃ | —C₂H₄SCH₃ |
| CN | H | 4-CN | 3,6-di-CH₃ | —CH₂CH₂S—C(=N-benzothiazolyl)S |
| s-pyrimidinyl | H | 4-CN | 3-CH₃ | —CH₂CH₂—S—C(1,2,4-triazolyl) |
| CN | CH₃ | 4-CN | 3-CH₃—6-NHCOCH₃ | —CH₂CH₂N(COCH₂)₂ (succinimido) |
| CN | Cl | 4-CN | 6-NHCOCH₃ | —C₂H₄O—C₆H₅ |
| CN | H | 4-CONH₂ | 3,6-di-CH₃ | —C₂H₄—N(CO-N(CH₃)-CO-CH₂) (hydantoin) |
| CN | H | 4-CON(C₂H₅)₂ | 3-CH₃ | —CH₂CHCH₂OH with OH |

TABLE III-continued

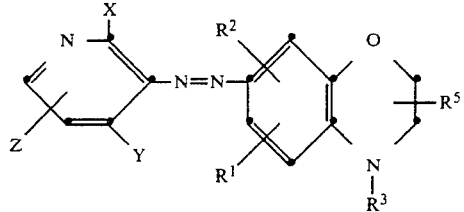

| X | Y | Z | R¹, R², R⁵ | R³ |
|---|---|---|---|---|
| CN | H | 4-SO$_2$N(C$_2$H$_5$)$_2$ | 3-CH$_3$—6-NHCOCH$_3$ | —C$_2$H$_4$—N(CO—O—CH$_2$)(CO—CH$_2$) ring |
| CN | H | 4-SCN | 6-NHCOCH$_3$ | —CH$_2$H$_4$—N(CO—CH$_2$)(CO—CH$_2$) ring |
| CN | H | 4-SCH$_3$ | 3,6-di-CH$_3$ | —C$_2$H$_4$—N(COCH$_2$)(COCH$_2$)CH$_2$ ring |
| SC$_6$H$_5$ | H | 4-CN | 3-CH$_3$ | —C$_2$H$_4$—N(CO)(CO)C$_6$H$_4$ ring |
| SC$_4$H$_9$—n | H | 4-CN | 3-CH$_3$—6-NHCOCH$_3$ | —C$_2$H$_4$—N(CO—NH)(CO—CH$_2$) ring |
| CN | C$_6$H$_5$ | 4-CN | 6-NHCOCH$_3$ | —C$_2$H$_4$—N(COCH$_2$)(COCH$_2$)O ring |
| CN | CN | 4-CN | 3,6-di-CH$_3$ | —C$_2$H$_4$—N(CO)(SO$_2$)C$_6$H$_4$ ring |
| NO$_2$ | H | H | 3-CH$_3$ | —C$_2$H$_4$—N(CO—S)(CO—CH$_2$) ring |

The invention has been described in detail with particular reference to preferred embodiments thereof, but it will be understood that variations and modifications can be effected within the spirit and scope of the invention.

We claim:

1. A compound having the formula

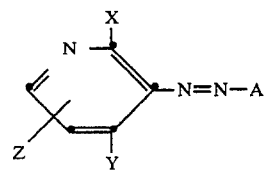

in which A is a coupler selected from those of the formulae

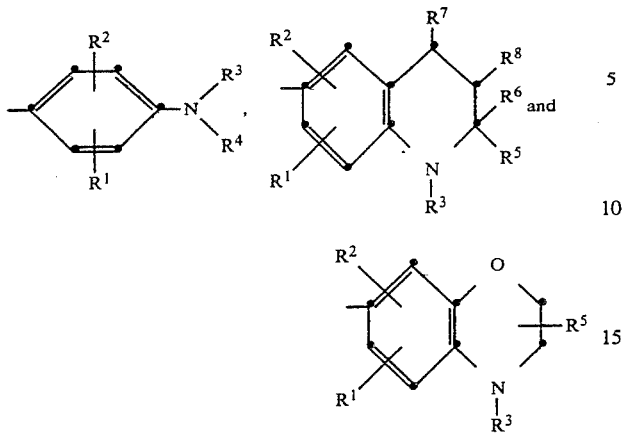

wherein
- R¹ and R² are each selected from hydrogen, fluorine, chlorine, bromine, lower alkyl, cycloalkyl, lower alkoxy, phenoxy, lower alkylthio, arylthio, and radicals having the formula —NH—X—R⁹ in which X is —CO—, —COO—, or —SO₂— and R⁹ is selected from lower alkyl and lower alkyl substituted with halogen, hydroxy, phenoxy, aryl, cyano, cycloalkyl, lower alkylsulfonyl, lower alkylthio, lower alkanoyloxy, and lower alkoxy, and when X in said formula —NH—X—R⁹ is —CO—, R⁹ is further selected from hydrogen, amino, lower alkenyl, lower alklamino, lower dialkylamino, arylamino, aryl, or furyl;
- R³ and R⁴ are selected from hydrogen; cycloalkyl; cycloalkyl substituted with one or two groups selected from lower alkyl, —OH, lower alkoxy, halogen and hydroxy substituted lower alkyl; phenyl or phenyl substituted with lower alkyl, lower alkoxy, halogen, lower alkanoylamino, cyano or lower alkoxycarbonyl; straight or branched lower alkenyl; R³ and R⁴ combined as pentamethylene, ethyleneoxyethylene or ethylenesulfonylethylene; straight or branched alkyl of 1–8 carbons and such alkyl substituted with the following: hydroxy; halogen, cyano; amino; lower alkoxy; lower alkoxyalkoxy; lower hydroxyalkoxy, succinimido; glutarimido; phenylcarbamoyloxy; phthalimido; phthalimidino; 2-pyrrolidono; cyclohexyl; phenoxy; phenyl or phenyl substituted with lower alkyl, lower alkoxy, halogen, lower alkanoylamino, cyano or lower alkoxycabonyl; lower alkanoylamino; lower alkylsulfamoyl; vinylsulfonyl; acrylamido; phthalimido; benzoylsulfonicimido; lower alkylsulfonamido; phenylsulfonamido; lower alkoxycarbonylamino; lower alkylcarbamoyloxy; lower alkoxycarbonyl; lower alkoxycarbonyloxy; lower alkenylcarbonylamino; a group having the formula

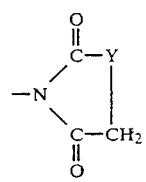

wherein Y is —NH—,

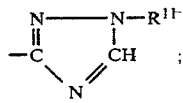

—O—, —S—, or —CH₂O—; —S—R¹⁰ wherein R¹⁰ is lower alkyl, phenyl, phenyl substituted with halogen, lower alkyl, lower alkoxy, lower alkanoylamino, cyano, or lower alkoxycarbonyl, pyridyl, pyrimidinyl, benzoxazolyl, benzimidazolyl, benzothiazolyl, or

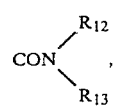

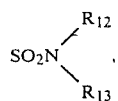
—CONR¹¹R¹¹; —SO₂NR¹¹R¹¹; wherein R⁹ and X are as defined above and each R¹¹ is selected from H, phenyl, lower alkyl, and lower alkyl substituted with halogen, —OH, phenoxy, aryl, —CN, cycloalkyl, lower alkylsulfonyl, lower alkylthio, lower alkanoyloxy, or lower alkoxy; lower alkoxy; lower alkoxy substituted with hydroxy, cyano, lower alkanoyloxy, or lower alkoxy; phenoxy; phenoxy substituted with one or more of lower alkyl, lower alkoxy or halogen; R⁵, R⁶, R⁷, and R⁸ are each selected from hydrogen and lower alkyl; and X, Y, and Z are independently selected from hydrogen, halogen, lower alkyl, lower alkoxy, aryl, cyano, carbamoyl, CONHR₁₂, $$CON\begin{matrix}R_{12}\\R_{13}\end{matrix},$$

SO₂R₁₂, COOR₁₂, SO₂NHR₁₂, $$SO_2N\begin{matrix}R_{12}\\R_{13}\end{matrix},$$

formyl, nitro, SCN, and SR₁₄, wherein R₁₂ is a group selected from lower alkyl, cycloalkyl, and aryl, each of which R₁₂ groups is unsubstituted or substituted with —CN, lower alkoxy, lower alkyl (for the cycloalkyl and aryl), hydroxy, lower alkanoyl or lower alkanoyloxy, R₁₃ is lower alkyl, lower alkyl substituted with cycloalkyl, or aryl, each of which substituents itself is unsubstituted or substituted with —CN, lower alkoxy, lower alkyl, hydroxy, lower alkanoyl or lower alkanoyloxy, and R₁₄ is a group selected from R₁₂ and the radicals

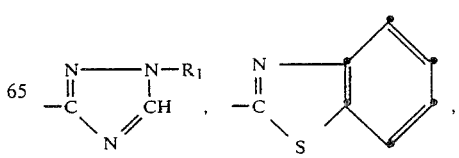

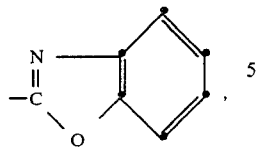

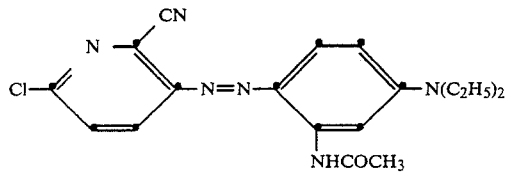

pyridyl, pyrimidinyl, and 1,3,4-thiadiazol-2-yl, and with the proviso that at least one of X and Y must always be cyano, $SO_2R_{12}$, $SR_{14}$, carbalkoxy, formyl, or nitro.

2. A dye according to claim 1 wherein X is cyano, $SO_2R_2$, $SR_{14}$, or $NO_2$; Y is H, halogen, cyano, $SO_2R_{12}$, or $SR_{14}$; Z is hydrogen; $R^1$ is $NHXR^9$; $R^2$ is H, lower alkyl or lower alkoxy; and $R^3$ and $R^4$ are each H, lower alkyl, phenyl, cyclohexyl, said cyclohexyl and phenyl substituted with one or two of lower alkyl, —CN, —OH, lower alkoxy, halogen, lower alkanoyloxy or lower alkoxycarbonyl, or lower alkyl substituted with 1–3 of —OH, —CN, lower alkoxy, lower alkoxycarbonyl, succinimido, cyclohexyl, phenyl, lower alkoxyalkoxy, phenoxy, —$OXR^9$, —NH—X—$R^9$, —X—$R^9$, —$CONR^{11}R^{11}$, or —$SO_2NR^{11}R^{11}$.

3. A dye according to claim 1 wherein X is cyano, $SO_2R_{12}$, $SR_{14}$, or $NO_2$; Y is H, halogen, cyano, $SO_2R_{12}$, or $SR_{14}$; Z is hydrogen; $R^1$ is meta-lower alkyl, lower alkanoylamino, lower alkylsulfonylamino, or benzoylamino; $R^2$ is H, lower alkyl or lower alkoxy; and $R^3$ and $R^4$ are each lower alkyl, cyclohexyl, or lower alkyl substituted with —OH, —CN, lower alkoxy, lower alkanoyloxy, lower alkoxycarbonyl, succinimido, cyclohexyl, or phenyl.

4. The compound according to claim 1 having the formula

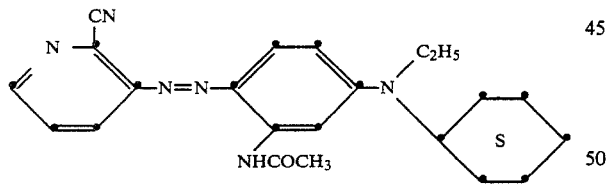

5. The compound according to claim 1 having the formula

6. The compound according to claim 1 having the formula

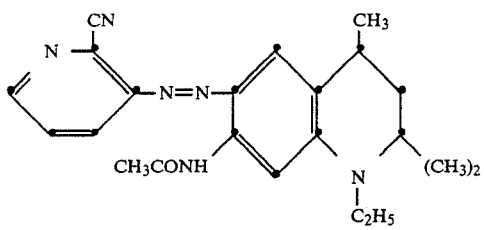

7. The compound according to claim 1 having the formula

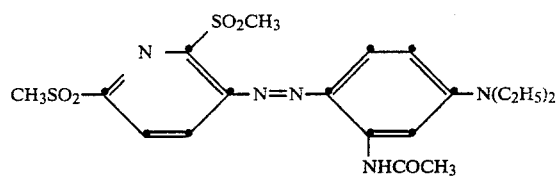

8. The compound according to claim 1 having the formula

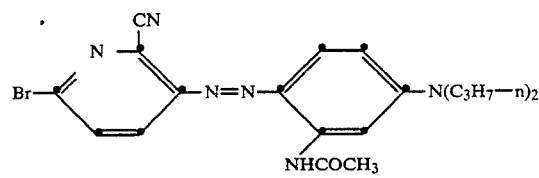

9. The compound according to claim 1 having the formula

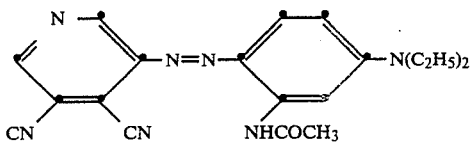

* * * * *

UNITED STATES PATENT AND TRADEMARK OFFICE
CERTIFICATE OF CORRECTION

PATENT NO. : 4,487,719
DATED : December 11, 1984
INVENTOR(S) : Max A. Weaver

It is certified that error appears in the above—identified patent and that said Letters Patent is hereby corrected as shown below:

Column 39, line 32, "alklamino," should read --- alkylamino, ---.

Column 39, line 45, "halogen," should read --- halogen; ---.

Column 39, line 46, "hydroxyalkoxy," should read --- hydroxyalkoxy; ---.

Signed and Sealed this

Ninth Day of July 1985

[SEAL]

Attest:

DONALD J. QUIGG

Attesting Officer    Acting Commissioner of Patents and Trademarks